United States Patent Office 3,472,813
Patented Oct. 14, 1969

3,472,813
RESISTANCE OF ACRYLONITRILE BUTADIENE STYRENE POLYMERS TO DISCOLORATION
Arthur C. Hecker, Forest Hills, and Charles Abramoff, Brooklyn, N.Y., assignors to Argus Chemical Corporation, Brooklyn, N.Y., a corporation of Delaware
No Drawing. Filed Jan. 18, 1967, Ser. No. 610,003
Int. Cl. C08f 45/58
U.S. Cl. 260—45.75                 15 Claims

ABSTRACT OF THE DISCLOSURE

Stabilizer combinations are provided capable of enhancing the resistance of acrylonitrile butadiene styrene polymers to discoloration when heated at elevated temperatures of 300 to 375° F. or higher, composed of an alkyl polyphosphate salt and a polyhydric polycyclic phenol. The acrylonitrile butadiene styrene polymers having an enhanced resistance to heat deterioration are also claimed, as well as a process for stabilizing such polymers by incorporating therein combinations of alkyl polyphosphate salts and the polyhydric polycyclic phenols.

The alkyl polyphosphates have the formula:

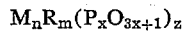

$$M_n R_m (P_x O_{3x+1})_z$$

wherein M is a monovalent or a bivalent metal, ammonium, quaternary ammonium, or an organic amine cation, R is an alkyl radical having from one to about twenty-four carbon atoms, $x$ is an integer from 2 to 4, $n$ is an integer representing the number of M atoms, $m$ is an integer representing the number of R groups, and $z$ is an integer representing the number of $(P_x O_{3x+1})$ radicals.

The polyhydric polycyclic phenols have the formula:

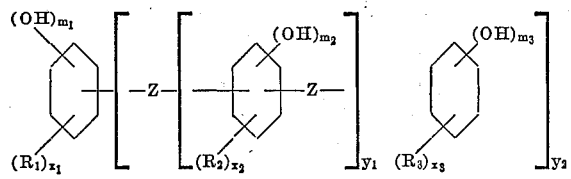

wherein $R_1$, $R_2$ and $R_3$ are inert substituents selected from the group consisting of hydrogen, halogen, and organic radicals containing from one to about thirty carbon atoms selected from the group consisting of alkyl, aryl, alkenyl, alkaryl, aralkyl, cycloalkenyl, cycloalkyl, alkoxy, aryloxy, acyl, carboxyl, and thiohydrocarbon groups, Z is selected from the group consisting of oxygen, sulfur, alkylene, alkenylene, alicyclene, arylene, and mixed alkylene-arylene and alkylene-alicyclene groups, $m_1$ and $m_3$ are integers from 1 to a maximum of 5, and $m_2$ is an integer from 1 to a maximum of 4, $x_1$ and $x_3$ are integers from 0 to 4, and $x_2$ is an integer from 0 to 3, $y_1$ is an integer from 0 to about 6, and $y_2$ is an integer from 1 to about 5.

This invention relates to compositions useful in improving the resistance of acrylonitrile butadiene styrene polymers to discoloration upon exposure to heat at elevated temperatures, comprising a mixture of an alkyl polyphosphate salt and a polyhydric polycyclic phenol; to acrylonitrile butadiene styrene polymer compositions having an enhanced resistance to discoloration upon exposure to elevated temperatures, due to incorporation therein of such compounds; and to a process of enhancing the resistance of acrylonitrile butadiene styrene polymers to discoloration.

Acrylonitrile butadiene styrene polymers, referred to in the art and sold under the name ABS polymers, are known for their excellent combination of mechanical, thermal and electrical properties, as well as chemical resistance, and nontoxicity. In addition, ABS polymers are known for their ease of processing, low cost, and availability in a variety of grades which makes it useful in a variety of ways. For example, ABS polymer is available as molding powders, pellets, and extruded sheets which can be fashioned into telephones, pipes, automobile parts, shoe heels, golf club heads, molded helmets, carrying cases, molded cams, gears, furniture, knobs, handles, lawn mower wheels, other sporting goods, toys, electrical appliances, and many others. As conventionally produced ABS polymers are subject to discoloration when heated at elevated temperatures, that is, at temperatures sufficiently high to flux them, and especially at temperatures in excess of about 300° F. Thus, when ABS polymers are fabricated at such temperatures the polymers are often so badly discolored that they are commercially unacceptable, even when pigments such as titanium dioxide are added thereto. Titanium dioxide added to ABS polymer as a whitener therefor does hide the discoloration of the ABS polymer to some extent, but an off-tint can remain unless extremely large and uneconomical quantities are used.

A number of stabilizers have been proposed for stabilization of ABS polymers against discoloration. For example, U.S. Patent No. 3,267,069 to Cummings, dated Aug. 16, 1966, suggests incorporating a mixture of zinc sulfide and an ester of thiodipropionic acid to inhibit discoloration and degradation of physical properties at elevated temperatures. Cummings discloses that his stabilizer combination can be employed with conventional stabilizers such as organic phosphites, polyhydric polycyclic phenols, and amine stabilizers.

U.S. Patent No. 3,244,668 to Knapp et al., dated Apr. 5, 1966, relates to the stabilization of plastics including styrene homopolymers and copolymers, such as polystyrene, and styrene-acrylonitrile copolymer; rubbery homopolymers of conjugated dienes; and rubbery copolymers of a conjugated diene and mono olefinic compound, employing a stabilizer system based on a combination of a side-chain-substituted cinnamic acid derivative of the type:

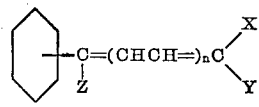

and a monocyclic hindered phenol of the type:

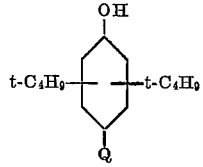

where Q is the aldehyde group (CHO) or the nitro group ($NO_2$). Three-component polymers such as ABS polymers are not disclosed. Knapp et al. indicates that among the stabilizers that can be employed in addition to the monocyclic phenols and cinnamic acid derivatives are salts of polyphosphoric acid partial esters.

U.S. Patent No. 2,499,503 to Huff et al., dated Mar. 7, 1950, shows that the alkali metal penta-alkyl tripolyphosphates, such as pentasodium penta 2-ethylhexyl tripolyphosphate, members of the class mentioned by Knapp et. al., are stabilizers for polyvinyl chloride resins.

In accordance with the instant invention, a stabilizer system for acrylonitrile butadiene styrene polymers (ABS polymers) is provided which enhances the resistance of ABS polymers to discoloration when heated at elevated temperatures. This combination consists essentially of an alkyl polyphosphate salt and a polyhydric polycyclic phenol. The phenol alone imparts improved but limited resistance, if any at all, to discoloration upon exposure to elevated temperatures. The polyphosphate alone does not noticeably improve the resistance of the ABS polymer to discoloration upon exposure to elevated temperatures. However, when the polyphosphate is used in combination with the phenol, the combination displays a surprising stabilizing action against discoloration indicating that the polyphosphate synergizes the stabilizing action of the phenol.

In addition, in accordance with the instant invention, ABS polymer compositions of improved resistance to discoloration due to exposure to elevated temperatures are provided consisting essentially of ABS polymer in combination with an alkyl polyphosphate salt, and a polyhydric polycyclic phenol.

Further, in accordance with the instant invention, a process for enhancing the resistance of ABS polymer to discoloration upon exposure to elevated temperatures is provided, which comprises incorporating in the ABS polymer an alkyl polyphosphate salt and a polyhydric polycyclic phenol.

The alkyl polyphosphate salts in accordance with the invention are defined by the following formula:

(I) $\quad M_n R_m (P_x O_{3x+1})_z$ wherein M is a monovalent or bivalent metal cation or an ammonium, quaternary ammonium or organic amine cation; R is an alkyl radical having from one to about twenty-four carbon atoms; $x$ is an integer from 2 to 4, representing the number of phosphorus atoms; $n$ is an integer representing the number of M atoms, $m$ is an integer representing the number of R groups, and $z$ is an integer representing the number of $(P_x O_{3x+1})$ radicals, and is determined according to the valence of M. Accordingly, $n$ is an integer within the range from 1 to $$\frac{z(\text{valence of } P_x O_{3x+1}) - m}{\text{valence of M}}$$

$m$ is an integer within the range from 1 to $z$(valence of $P_x O_{3x-1}) - n$ (valence of $m$); and $z$ is an integer within the range from 1 to $$\frac{n(\text{valence of metal}) + m}{\text{valence of polyphosphate group}}$$

This group encompasses three principal subgenera of organometallic polyphosphates, the pyrophosphates, tripolyphosphates and tetrapolyphosphates.

Where M is monovalent, these polyphosphates take the following form:

(II) $\quad M_n R_{3-n} P_2 O_7$

Pyrophosphates:

(A) $MR_3 P_2 O_7$
(B) $M_2 R_2 P_2 O_7$
(C) $M_3 R P_2 O_7$ (III) $\quad M_n R_{5-n} P_3 O_{10}$ Tripolyphosphates:

(A) $MR_4 P_3 O_{10}$
(B) $M_2 R_3 P_3 O_{10}$
(C) $M_3 R_2 P_3 O_{10}$
(D) $M_4 R P_3 O_{10}$
(E) $M_5 R_5 (P_3 O_{10})_2$ (IV) $\quad M_n R_{6-n} P_4 O_{13}$ Tetrapolyphosphates:

(A) $MR_5 P_4 O_{13}$
(B) $M_2 R_4 P_4 O_{13}$
(C) $M_3 R_3 P_4 O_{13}$
(D) $M_4 R_2 P_4 O_{13}$
(E) $M_5 R P_4 O_{13}$

Where M is bivalent, these polyphosphates take the following form:

(V) $\quad M_n R_{8-2n} (P_2 O_7)_2$

Pyrophosphates:

(A) $M_3 R_2 (P_2 O_7)_2$
(B) $M_2 R_4 (P_2 O_7)_2$
(C) $MR_6 (P_2 O_7)_2$ (VI) $\quad M_n R_{10-2n} (P_3 O_{10})_2$ Tripolyphosphates:

(A) $M_4 R_2 (P_3 O_{10})_2$
(B) $M_3 R_4 (P_3 O_{10})_2$
(C) $M_2 R_6 (P_3 O_{10})_2$
(D) $MR_8 (P_3 O_{10})_2$ (VII) $\quad M_n R_{12-2n} (P_4 O_{13})_2$ Tetrapolyphosphates:

(A) $M_5 R_2 (P_4 O_{13})_2$
(B) $M_4 R_4 (P_4 O_{13})_2$
(C) $M_3 R_6 (P_4 O_{13})_2$
(D) $M_2 R_8 (P_4 O_{13})_2$
(E) $MR_{10} (P_4 O_{13})_2$

M, R and $n$ as used in the above formulae are the same as defined hereinbefore.

Typical metal cations (M) are, for example, sodium, potassium, lithium, barium, magnesium, strontium, calcium, tin, zinc, cadmium and nickel, and in addition, ammonium as well as organic amines, such as tri(tert-butyl)-amine, triethanolamine, diethanolamine, monoethanolamine, monoethanolamine, and quaternary bases such as tetramethyl ammonium hydroxide, and tetraethyl ammonium hydroxide.

Typical alkyl radicals (R) are, for example, methyl, ethyl, propyl, isopropyl, butyl, isobutyl, sec-butyl, t-butyl, amyl, isoamyl, capryl, hexyl, heptyl, n-octyl, isooctyl, t-octyl, 2-ethylhexyl, nonyl, decyl, isodecyl, undecyl, dodecl, stearyl, palmityl, myristyl, and behenyl.

As exemplary of the polyphosphates which can be used, in addition to those given in the examples which follow, there can be mentioned pyrophosphates such as methyl trisodium pyrophosphate,
diethyl diammonium pyrophosphate,
butyl triammonium pyrophosphate,
diisoamyl dipotassium pyrophosphate,
dicapryl dilithium pyrophosphate,
dipropyl cadmium pyrophosphate,
di-2-ethylhexyl barium pyrophosphate,
tetralauryl dizinic dipyrophosphate,
and hexastearyl calcium dipyrophosphate;
tripolyphosphates such as triethyl diammonium tripolyphosphate,
t-butyl tetrapotassium tripolyphosphate,
tetra-2-ethylhexyl sodium tripolyphosphate,
dicapryl tri-triethanolamino tripolyphosphate,
tridecyl disodium tripolyphosphate, tetrastearyl sodium tripolyphosphate,
isoamyl tetrasodium tripolyphosphate,
dioctyl tripotassium tripolyphosphate,
tricapryl dipotassium tripolyphosphate,
tri-2-ethylhexyl dimonoethanolamino tripolyphosphate,
tri-2-ethylhexyl barium tripolyphosphate,
tri-2-ethylhexyl nickel tripolyphosphate, and
tetra-2-ethylhexyl trizinic di-(tripolyphosphate);
and tetrapolyphosphates such as
triethyl triammonium tetrapolyphosphate,
triethyl tripotassium tetrapolyphosphate,
diiso-amyl tetrasodium tetrapolyphosphate,
tetraoctyl dipotassium tetrapolyphosphate,
monocapryl tetrasodium tetrapolyphosphate,
hexaethyl tricadmium di-tetrapolyphosphate,
tetra-2-ethylhexyl tetrabarium di-tetrapolyphosphate,
decastearyl calcium di-tetrapolyphosphate,
decanonyl strontium di-tetraphosphate,
hexalauryl trinickel di-tetrapolyphosphate, and
hexadodecyl trizinic di-tetrapolyphosphate.

The alkyl polyphosphate salt employed in the instant invention can be prepared by reacting in the presence of water phosphorus pentoxide, the desired aliphatic alcohol, and the desired metal oxide or hydroxide.

The following examples are illustrative of the preparation of several alkyl polyphosphates which can be employed in the instant invention.

EXAMPLE A

Deca-2-ethylhexyl penta-cadmium tetra-tripolyphosphate was prepared as follows:

2-ethylhexanol (32.5 g., 0.25 mole) was added dropwise to phosphorus pentoxide (21.25 g., 0.15 mole, weighed under benzene) with stirring. The temperature of the mixture rose to 86° C. Thereafter, cadmium oxide (16 g., 0.125 mole) and 10 ml. water were added to this mixture during a 45 minute period.

The product formed was a white soapy mass which was dried on a steam bath for 8 hours and in a vacuum oven at a temperature of 60 to 80° C. for 14 hours. The dry product was a hard white solid which upon titration with ethylene diamine tetraacetic acid was found to contain 20.5% cadmium, which is the theoretical amount of cadmium contained in $Cd_5(C_8H_{17})_{10}(P_3O_{10})_4$.

EXAMPLE B

Deca-2-ethylhexyl penta-barium tetra-tripolyphosphate was prepared as follows:

2-ethylhexanol (32.5 g., 0.25 mole) was added dropwise with stirring to phosphorus pentoxide (21.25 g., 0.15 mole). The temperature of this mixture rose to about 86° C. Thereafter, barium hydroxide octahydrate (39.4 g., 0.125 mole) and 10 ml. water were added to this mixture during a 45 minute period.

The product obtained was a white soapy mass which was dried on a steam bath for 8 hours and then a vacuum oven for 14 hours at a temperature of 60 to 80° C. The dry product obtained was a hard white solid which upon being titrated with perchloric acid in glacial acetic acid to a crystal violet end point was found to contain 27.25% barium. The theoretical amount of barium contained in $Ba_5(C_8H_{17})_{10}(P_3O_{10})_4$ is 25.15%.

EXAMPLE C

Pentastearyl penta-sodium di-tripolyphosphate was prepared as follows:

Phosphorus pentoxide (85 g., 0.6 mole weighed under benzene) was poured into a two liter 4-neck flask fitted with a heavy duty stirring motor. A mixture of alcohols (269 g.) containing a major portion of stearyl alcohol and having the following composition: 62.04% $C_{18}H_{37}OH$, 35.6% $C_{16}H_{33}OH$, 1.9% $C_{14}H_{29}OH$ and 0.1% $C_{12}H_{25}OH$, dissolved in benzene, was added dropwise to the phosphorus pentoxide with high speed agitation. Thereafter, sodium hydroxide (40 g., 1.0 mole) dissolved in water (100 cc.) was added dropwise to the mixture of alcohol and phosphorus pentoxide.

The fluid product was poured into a stainless steel tray and evaporated on a steam bath, and then dried in a vacuum oven for 6 hours at a temperature of 70 to 85° C.

The final product was an easily crushed white solid which was insoluble in water and which melted over a broad range and completely melted at 175° C. The actual yield of the product was about 379 g., which was 95.6% of the theoretical yield of pentastearyl penta-sodium di-tripolyphosphate which is 397 g.

EXAMPLE D

Penta-iso-tridecyl penta-sodium di-tripolyphosphate was prepared as follows:

Phosphorus pentoxide (85 g., 0.6 mole weighed under benzene) was added to a two liter 4-neck flask fitted with a heavy duty stirring motor. Iso-tridecyl alcohol (200 g.) dissolved in benzene was then added dropwise to the phosphorus pentoxide with high speed agitation. Sodium hydroxide (40 g., 1.0 mole) dissolved in water (100 cc.) was dropwise to the mixture of the iso-tridecyl alcohol and phosphorus pentoxide.

The fluid product was dried in a vacuum oven for 6 hours at 90° C. The dry product was a waxy white solid which was soluble in water. The actual yield of the product was 91.8% of that theoretically expected for penta-iso-tridecyl penta-sodium di-tripolyphosphate.

EXAMPLE E (a) Penta-2-ethylhexyl penta-sodium di-tripolyphosphate was prepared as follows:

Phosphorus pentoxide (42.5 g., 0.3 mole weighed under benzene) was added to a stirred mixture of 2-ethylhexanol (65 g., 0.5 mole) and sodium hydroxide (20 g., 0.5 mole) and water (20 g.). The temperature of this mixture rose from room temperature to 98° C. The product was dried in a vacuum oven for 6 hours at 90° C., resulting in a pasty solid which retained water and had a solids content of 81%. The sodium content of the 81% paste was found to be 5.61%. The theoretical amount of sodium contained in penta 2-ethylhexyl penta-sodium di-tripolyphosphite in an 81% paste is 6.94%.

(b) Pentasodium penta-2-ethylhexyl di(tri-polyphosphate) was prepared in an alternate procedure as follows.

2-ethylhexanol (65 g.) was added during a 15 minute period to a stirred mixture of phosphorus pentoxide (42.5 g.) and hexane (100 ml.) in a 500 ml. tall form beaker. The temperature of the mixture rose to 72° C. Thereafter, sodium hydroxide (20 g.) in water (20 ml.) was slowly added to the mixture with stirring. The beaker containing the mixture was then heated for four hours on a steam bath and the mixture was dried in a vacuum oven at 82° C. for 8 hours.

The product obtained was a white rubbery solid which upon being titrated with perchloric acid was found to contain 8.56% sodium. The theoretical amount of sodium contained in penta-2-ethylhexyl penta-sodium di-tripolyphosphate is 9.79% sodium.

The polyhydric polycyclic phenols include aromatic nuclei which are linked by a polyvalent linking radical and are defined by the formula:

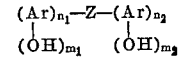

wherein Z is a polyvalent linking group selected from the group consisting of oxygen; sulfur; aliphatic, cycloaliphatic, and aromatic hydrocarbons; oxyhydrocarbon;

thiohydrocarbon; heterocyclic; carbonyl; sulfinyl; and sulfonyl groups, and has up to twenty carbon atoms.

Ar is a phenolic nucleus which can be a phenyl or a polycarbocyclic group having condensed or separate phenyl rings; each Ar group contains at least one free phenolic hydroxyl group up to a total of four ($m_1$ and $m_2$ = 1 to 4)

and $n_1$ and $n_2$ are numbers, one or greater, and preferably from one to four. The Ar rings can also include additional rings connected by a bivalent linking nucleus of the type Z, for example, Ar–Z–Ar–Z–Ar.

The aromatic nucleus Ar can, in addition to phenolic hydroxyl groups, include one or more inert substituents. Examples of such inert substituents include hydrogen, halogen atoms, e.g. chlorine, bromine and fluorine; organic radicals containing from one to about thirty carbon atoms, such as alkyl, aryl, alkenyl, alkaryl, aralkyl, cycloalkenyl, cycloalkyl, alkoxy, aryloxy and acyloxy

where R' is aryl, alkyl or cycloalkyl, or thio-hydrocarbon groups having from one to about thirty carbon atoms, and carboxyl

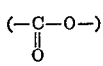

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

The simplest form of polyhydric polycyclic phenol has the structure:

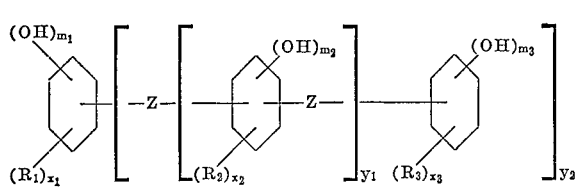

wherein $R_1$, $R_2$ and $R_3$ are inert substituent groups as set forth above, $m_1$ and $m_3$ are integers from one to a maximum of five, $m_2$ is an integer from one to a maximum of four, $x_1$ and $x_3$ are integers from zero to four, and $x_2$ is an integer from zero to three; $y_1$ can be an integer from zero to about six and $y_2$ can be an integer from one to five, preferably one or two.

Preferably, the hydroxyl groups are located ortho and/or para to Z, and there is only one hydroxyl group per phenyl nucleus.

Exemplary Z groups are alkylene, alkylidene, alkenylene, arylalkylene, aralkylidene, cycloalkylene and cycloalkylidene, and oxa- and thia-substituted such groups, carbonyl groups, tetrahydrofuranes, esters and triazino groups. The Z groups are usually bi-, tri-, or tetravalent, connecting two, three or four Ar groups. However, higher valence Z groups, connecting more than four Ar groups, can also be used. According to their constitution the Z groups can be assigned to subgenera as follows:

(1) Z groups made up of a single carbon carrying at least one hydrogen with other substituents linking two Ar nuclei, such as

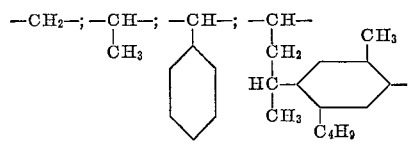

and

(2) Z groups made up of a single carbon carrying only substituents other than hydrogen, such as

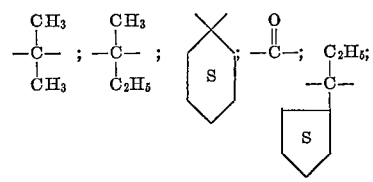

and

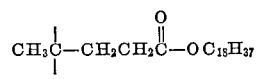

(3) Z groups where at least two carbons connect the aromatic groups in an open-chain or cyclic arrangement, such as

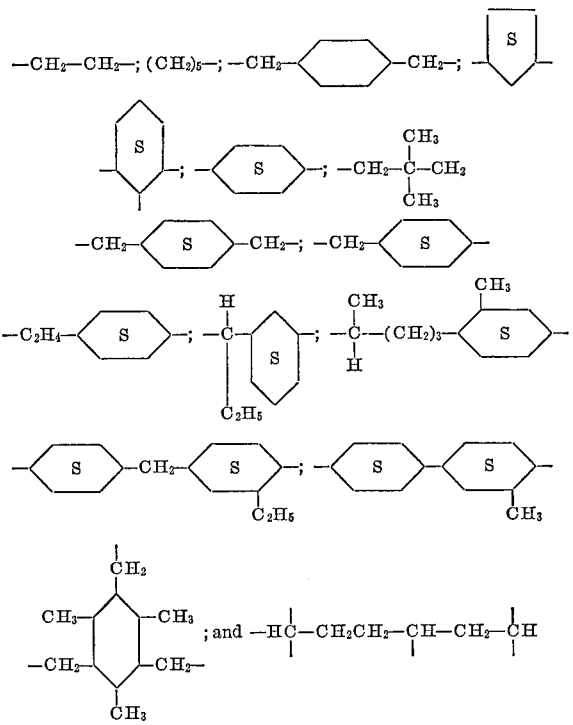

(4) Z groups where only atoms other than carbon link the aromatic rings, such as

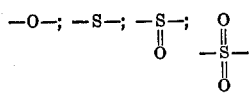

and —(S)$_x$—.

(5) Z groups made up of more than a single atom including both carbon and other atoms linking the aromatic nuclei, such as

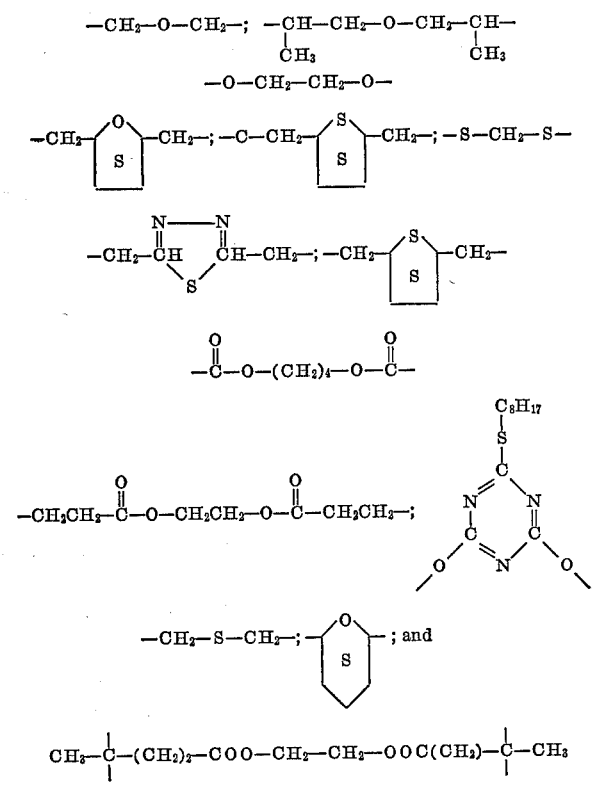

Although the relation of effectiveness to chemical structure is insufficiently understood, many of the most effective phenols have Z groups of subgenus 3, and accordingly this is preferred.

Exemplary polyhydric polycyclic phenols used in accordance with the instant invention are 4,4'-methylenebis-(2-tertiary-butyl-5-methyl-phenol),
2,2'-bis(4-hydroxyphenyl) propane,
methylenebis-(p-cresol),
4,4'-oxobis-phenol,
4,4'-oxobis(3-methyl-5-isopropyl-phenol),
4,4'-oxobis(3-methyl-phenol),
2,2'-oxobis(4-dodecyl-phenol),
2,2'-oxobis(4-methyl-5-tertiary-butyl-phenol),
4,4'-n-butylidenebis-(2-t-butyl-5-methyl-phenol),
2,2'-methylenebis-[4-methyl-6(1'-methyl-cyclohexyl)-phenol],
4,4'-cyclohexylidenebis(2-tertiary-butyl-phenol),
2,6-bis-(2'-hydroxy-3'-t-butyl-5'-methyl-benzyl)-4-methyl-phenol,
4,4'-oxobis(naphthalene-1,5-diol),
1,2'-methylenebis(naphthalene-1,8-diol),
1,3'-bis(naphthalene-2,5-diol)propane, and
2,2'-butylidenebis(naphthalene-2,7-diol),
di(hydroxyphenyl)ketone,
(3-methyl-5-tert-butyl-4-hydroxyphenyl)-(4'-hydroxyphenyl)methane,
2,2'-methylenebis(4-methyl-5-isopropylphenol),
2,2'-methylenebis(5-tert-butyl-4-chlorophenol),
(3,5-di-tert-butyl-4-hydroxyphenyl)-(4-hydroxyphenyl)methane,
(2-hydroxy-phenyl)-(3',5'-di-tert-butyl-4'-hydroxyphenyl)methane,
2,2'-ethylidenebis(4-octylphenol),
4,4'-isopropylidenebis(2-tert-butyl-phenol),
2,2'-isobutylidenebis-(4-nonylphenyl),
2,4-bis(4-hydroxy-3-t-butylphenoxy)-6-(n-octylthio)-1,3,5-triazine,
2,4,6-tris(4-hydroxy-3-t-butylphenoxy)-1,3,5-triazine,
2,2'-bis-(3-t-butyl-4-hydroxyphenyl)thiazolo-(5,4-d)thiazole,
2,2'-bis(3-methyl-5-t-butyl-4-hydroxyphenyl)-thiazolo-(5,4-d)-thiazole,
4,4'-bis(4-hydroxyphenyl)pentanoic acid octadecyl ester,
cyclopentylidene 4,4'-bisphenol,
2-ethylbutylidene 4,4'-bisphenol,
4,4'-cyclooctylidenebis(2-cyclohexylphenol),
β,β-thiodiethanolbis(3-tert-butyl-4-hydroxyphenoxy acetate),
1,4-butanediolbis(3-tert-butyl-4-hydroxyphenoxy acetate),
pentaerythritoltetra(4-hydroxyphenol propionate),
2,4,4'-tri-hydroxy benzophenone,
bis(2-tert-butyl-3-hydroxy-5-methylphenyl) sulfide
bis(2-tert-butyl-4-hydroxy-5-methylphenyl) sulfide,
bis(2-tert-butyl-4-hydroxy-5-methylphenyl) sulfoxide,
bis(3-methyl-5-tert-butyl-4-hydroxy benzyl) sulfide,
bis(2-hydroxy-4-methyl-6-tert-butyl phenyl) sulfide,
4,4'-bis(4-hydroxyphenyl) pentanoic acid octadecyl thioprionate ester,
1,1,3-tris(2'-methyl-4'-hydroxy-5'-tert-butylphenyl) butane,
1,1,3-tris(1-methyl-3-hydroxy-4-tert-butylphenyl) butane,
1,8-bis(2-hydroxy-5-methylbenzoyl)-n-octane,
2,2'-methylene-bis[4'-(3-tert-butyl-4-hydroxyphenyl)-thiazole],
1-methyl-3-(3-methyl-5-tert-butyl-4-hydroxybenzyl) naphthalene,
2,2'-(2-butene)bis(4-methoxy-6-tert-butyl phenol).

The polyhydric polycyclic phenols used in the invention can also include condensation products of phenol or alkyl phenols with aldehydes, for example, formaldehyde, acetaldehyde, and propionaldehyde, or with ketones, for example, acetone.

The polyhydric polycylic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, alloocimene, isoprene, and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation cataylst and unchanged starting material, can be used with excellent results while the exact structure of these phenolic condensation products is uncertain, the Z group linking the phenolic nuclei all falls into the preferred subgenus 3. For methods of preparation see e.g. U.S. Patent No. 3,124,555, U.S. Patent No. 3,242,135, British Patent No. 961,504.

A sufficient amount of the stabilizer combination of the invention is used to enhance the resistance of the ABS polymer against discoloration upon exposure to elevated temperatures. Small amounts are susally adequate. Amounts within the range from about 0.1 to about 10% total stabilizers by weight of the ABS polymer are satisfactory. Preferably, from about 0.25 to about 2% is employed for optimum stabilization. Amounts of the polyphosphate within the range from about 0.05 to about 5% by weight of the ABS polymer and amounts of the polyhydric polycyclic phenol within the range from about 0.05 to about 5% by weight of the ABS polymer are satisfactory. Preferably, from about 0.25 to about 2% of the polyphosphate and from about 0.25% to 2% of the polyhydric polycylic phenol are employed, for optimum enhancement of resistance to discoloration.

The stabilizer combination of the invention generally contains from about 10 to about 50 parts of polyphosphate and from about 10 to about 50 parts of the polyhydric plycyclic phenol, by weight of the combination.

The stabilizer composition can be formed by simply mixing the individual ingredients in the dry state or in a suitable liquid medium. It is frequently helpful to combine the phenol with the freshly prepared polyphosphate salt in the presence of the solvent and water in which the salt has been prepared before the solvent and water are finally removed. Another helpful expedient is to prepare the stabilizer composition in the form of an aqueous emulsion. Such an emulsion can be added to a freshly made ABS polymer latex before the polymer is isolated from the latex by the usual procedures of coagulation or spray-drying. A "masterbatch" technique can be utilized to provide both wet and dry combinations of the stabilizer composition with the ABS polymer in proportions for compounding into larger quantities of polymer to be stabilized.

In addition to the polyphosphate and phenol, other thermal antioxidants and light stabilizers can be employed in the compositions of the present invention, such as organic phosphites as set out in U.S. Patent No. 3,244,650 to Hecker et al., dated Apr. 5, 1966, the organic phosphites having the formula $(RA)_3 P$ in which A can be oxygen or sulfur or a mixture of the same, and R can be selected from the group consisting of aryl, alkyl, cycloalkyl, aralkyl and alkaryl groups, in any combinations, and esters of thiodipropionic acid as set out in U.S. Patent No. 3,255,136 to Hecker et al., dated June 7, 1966.

ABS polymers are conventionally blended with additives such as fillers, pigments and lubricants. Appropriate pigments and fillers are, for example, flour, cotton, shredded or chopped cloth, talc, chopped canvas, paper pulp forms, asbestos, powdered mica, calcium carbonate, carbon, graphite, quartz, diatomaceous earth silica, fibrous glass, barytes, calcium silicate, iron, barium sulfate, litharge, clay and titanium dioxide. Fillers are normally used in an amount of from about 2 to about 40% by weight of the polymer. Typical lubricants are mineral oil, natural and synthetic waxes, fatty acids such as stearic acid, alkaline earth and heavy metal stearates, and aliphatic alcohols, ketones, and epoxides having from about 16 to about 60 carbon atoms in the molecule, including stearyl alcohol, palmitone, behenone, oleone, cetyl palmitate, 1,2-epoxydocosane, and isooctyl epoxystearate, in amounts of from about 0.2 to 3% of the polymer.

If a combination of stabilizers is to be used, it may be formulated as a simple mixture for incorporation in the ABS polymer by the polymer manufacturer or by the converter. An inert organic solvent such as xylene, cyclohexanone, ethyl benzene and the like can be used to facilitate handling, if the ingredients do not form a homogeneous mixture or solution.

The stabilizer combinations of the invention are effective with acrylonitrile butadiene styrene polymers as a class. Many of the ABS polymers available commercially are prepared by dispersing an elastomeric phase such as a diene homopolymer such as polybutadiene into a rigid styrene-acrylonitrile copolymer or a terpolymer. The elastomeric phase can also be a copolymer with styrene or acrylonitrile, or a styrene acryonitrile graft on an elastomeric substrate, such as polybutadiene. The contribution of the acrylonitrile, styrene and butadiene is each important. Terpolymers of the three monomers do not always have the desired properties, and ABS graft copolymers are most common, and include a styrene acrylonitrile copolymer phase and a preformed polybutadiene substrate on which is grafted styrene and acrylonitrile, usually by emulsion, bulk or suspension polyemrization. See Chemistry and Industry, Aug. 13, 1966, pages 1399–1405. All of these are encompassed herein under the terms "acrylonitrile butadiene styrene polymer," or "ABS polymer."

ABS polymers generally contain from about 15 to about 35% acrylonitrile, from about 5 to about 35% butadiene, and from about 40 to about 80% styrene, by weight. The matrix usually has a molecular weight of from about 200,000 to about 450,000 or more, and a density of from about 0.99 to about 1.09.

The acrylonitrile portion of the ABS polymer imparts chemical resistance to the polymer; the styrene portion of the ABS polymer imparts good fabrication characteristics to the polymer; and the rubber or butadiene portion of the ABS polymer provides the rubberiness and toughness to the polymer. Accordingly, chemical resistance, good fabrication characteristics, and rubberiness and toughness features can be varied in any given ABS polymer by varying the quantities of the acrylonitrile, butadiene and styrene. For example, the impact strength of the ABS polymer can be increased by increasing the amount of butadiene in the polymer. However, increase in impact strength is accompanied by slight reduction in heat resistance, rigidity, electrical properties and some of the other strength properties.

Heat resistant properties of the ABS polymer can be improved by increasing the amount of acrylonitrile in the polymer. However, increased heat resistance, such as increasingly high heat-distortion temperatures, usually is accompanied by decreased impact strength, especially at low temperatures. Increasingly good fabrication characteristics of the polymer is obtained where larger quantities of styrene are used. However, such an ABS polymer usually has lower impact strength. Accordingly, the impact strength of ABS polymer at 73° F. varies from 9 ft.-lb./in. notch in extra high and low temperature impact grades, to 1.5 for medium impact grades.

The tensile strength of ABS polymer varies from 8800 p.s.i. for medium impact grades, with a tensile modulus of 400,000 to as low a tensile strength as 2400 p.s.i., for a semi-flexible extrusion grade, and a tensile modulus of 2,100,000. The hardness of ABS polymer ranges from a Rockwell 118 for medium impact grade to a Rockwell 62 for a low temperature grade material. The range of deflection temperature for ABS polymer is from 230° F. at 264 p.s.i. and 240° F. at 66 p.s.i., respectively, for heat resistant grades, to as low as 145° F. at 264 p.s.i. and 202° F. at 66 p.s.i., respectively, with most commercial grades falling in the upper end of the range.

ABS polymer can be prepared by polymerizing acrylonitrile monomer and styrene monomer in a previously prepared polybutadiene latex, or butadiene copolymer rubber latex, under such conditions than an appreciable portion of the acrylonitrile and styrene become grafted or polymerized directly on the polybutadiene molecules. The polybutadiene portion or base portion of the ABS graft polymer molecule is rubbery, while the acrylonitrile and styrene grafted comonomer portions of the graft polymer molecule are resinous. See U.S. Patent No. 2,820,773, dated Jan. 21, 1958, to Childers and Fisk for a detailed description of the graft polymerization technique for forming ABS polymer.

ABS polymer can also be prepared by blending styrene-acrylonitrile copolymer resins with butadiene-based elastomers, such as is described in U.S. Patent No. 2,439,902, dated Apr. 6, 1948 to Daly, and No. 2,600,024, dated June 10, 1952 to Romeyn et al.

In addition, ABS graft copolymer can be physically blended with additional quantities of separately prepared resin, for example, styrene-acrylonitrile resin, with or without additional separately prepared butadiene-acrylonitrile copolymer rubber. See U.S. Patent No. 2,802,808 dated Aug. 13, 1957 to Hayes for a complete description of the preparation of ABS polymer from ternary blends containing a resin, for example, a copolymer of styrene of α-methylstyrene with acrylonitrile or methacrylonitrile, a rubber (polybutadiene or butadiene copolymer), and a graft copolymer of styrene-acrylonitrile and butadiene.

Mixtures of ABS polymers with other compatible polymers, (for example, the polycarbonate of 4,4'-isopropylidene-bisphenol) and copolymers of acrylonitrile, or methacrylonitrile, butadiene, and styrene, such as acrylonitrile-styrene, butadiene-styrene, and butadiene-acrylonitrile rubber, the ABS polymer being present in a sufficient amount, usually a major amount, that is, about 85% by weight or more to present the stabilization problem resolved by the invention, can also be stabilized.

Furthermore, the styrene monomer of the ABS polymer can be replaced in whole or in part by α-methylstyrene in order to improve the heat distortion temperatures of the ABS polymer. Similarly, methyl methacrylate can be used in place of some of the acrylonitrile.

All of the above polymers fall within the term "ABS polymer," as used herein.

Typical available ABS polymers and their physical properties are:

TABLE A

| Grade and Characteristics | | | | Cycolac ABS Polymers | | | | |
|---|---|---|---|---|---|---|---|---|
| | | | | GS | T | X-27 | X-17 | X-7 |
| PROPERTIES—Reported values pertain only to natural resins; pigmenting may vary the properties | Condition | Units | ASTM test Method | Maximum toughness with high modulus, GSM injection and blow molding, GSE extrusion | Toughness with high flow, injection molding | Maximum high heat with high modulus, injection molding, extrusion | Maximum high heat with good moldability, injection molding, extrusion | High heat with toughness, injection molding, extrusion |
| MECHANICAL: | | | | | | | | |
| Izod impact strength, unnotched ⅛" bar (²), notched | 73° F. 73° F. −20° F. −40° F. | Ft.-lbs./in. notch. | D-256-56, Method A. | 29.3 6.2 2.6 2.1 | 26.0 5.3 2.1 1.8 | 33.0 3.1 1.3 1.0 | 2.5 0.7 | 32.0 4.2 1.4 1.2 |
| Charpy impact strength, unnotched ¼" bar (¹) notched | 73° F. 73° F. −20° F. −20° F. | do | D-256-56, Method B. | 35.0 4.7 2.6 2.2 | 26.0 3.7 2.1 1.7 | 19.3 1.9 1.1 0.9 | | 33.0 3.1 1.7 1.4 |
| Tensile strength, Type 1, ⅛" thickness (²). | 160° F. 73° F. −40° F. | P.s.i. | D-638-61T, 0.2"/min. | 3,400 5,900 9,200 | 3,200 6,000 9,500 | 4,600 7,300 11,500 | 7,200 | 4,000 6,900 10,400 |
| Tensile modulus, Type I, ⅛" thickness (²). | 73° F | P.s.i. | D-638-61T, 0.2"/min. | 310,000 | 300,000 | 390,000 | 380,000 | 330,000 |
| Flexural strength, ⅛" x 1" x 4" bar (¹) | 160° F. 73° F. −40° F. | P.s.i. | D-790-61, 0.05"/min. | No failure | No failure | No failure | No failure | No failure |
| Flexural yield strength, ⅛" x 1" x 4" bar (¹). | 160° F. 73° F. −40° F. | P.s.i. | D-790-61, 0.05"/min. | 5,700 9,700 15,200 | 5,500 9,600 15,100 | 7,500 11,800 18,800 | 6,800 10,600 18,100 | 6,200 10,200 16,100 |
| Flexural modulus, ⅛" x 1" x 4" bar (¹) | 160° F. 73° F. −40° F. | P.s.i. | D-790-61, 0.05"/min. | 220,000 320,000 360,000 | 210,000 320,000 360,000 | 310,000 400,000 460,000 | 270,000 380,000 420,000 | 260,000 360,000 390,000 |
| Hardness, ¼" thickness (¹) | 73° F. | Rockwell R | D-785-62, Method A. | 103 | 104 | 112 | 110 | 107 |
| Wear index, Taber, Volume loss method, CS-17 wheel, 1,000 g. weight. | 73° F., 50% R.H. | Percent | | 19.2 | 18.8 | | | 19.0 |
| Deformation under load (¹) | 24 hr., 122° F., 2,000 p.s.i. | Percent | D-621-59 | 0.52 | 0.53 | 0.21 | | 0.36 |
| THERMAL: | | | | | | | | |
| Coefficient of linear thermal expansion | | In./in./° C In./in./°F | D-696-44 Calculated | 9.5×10⁻⁵ 5.3×10⁻⁵ | 9.5×10⁻⁵ 5.3×10⁻⁵ | 6.0×10⁻⁵ 3.3×10⁻⁵ | 6.2×10⁻⁵ | 8.2×10⁻⁵ 4.5×10⁻⁵ |
| Deflection temperature unannealed, ½" x ½" x 5" bar (¹). | 264 p.s.i. 66 p.s.i. Zero load | ° F. at 10 mils deflection. | D-648-56 | 193 211 221 | 192 209 250 | 226 238 250 | 220 | 203 220 230 |
| Deflection temperature annealed, ½" x ½" x 5" bar (¹). | 264 p.s.i. 66 p.s.i. Zero load | do | D-648-56 | 218 224 229 | 215 221 226 | 244 249 254 | 238 | 224 230 235 |
| Thermal conductivity | | B.t.u./hr./ft.²/ °F./in. Cal./sec./ cm.²/°C./ cm. | C-177-45 | 1.55 5.45×10⁻⁴ | 1.54 5.30×10⁻⁴ | 2.38 8.18×10⁻⁴ | | 1.99 6.52×10⁻⁴ |
| Flammability, ⅛" x ½" x 5" bar (¹) | | In./min | D-635-63 | 1.5 | 1.5 | 1.8 | | 1.4 |

See footnotes at end of table.

TABLE A—Continued

| Grade and Characteristics | | | Cycolac ABS Polymers | | | | |
|---|---|---|---|---|---|---|---|
| | | | GS | T | X-27 | X-17 | X-7 |
| PROPERTIES—Reported values pertain only to natural resins; pigmenting may vary the properties | Condition Units | ASTM test Method | Maximum toughness with high modulus, GSM injection and blow molding, GSE extrusion | Toughness with high flow, injection molding | Maximum high heat with high modulus, injection molding, extrusion | Maximum high heat with good moldability, injection molding, extrusion | High heat with toughness, injection molding, extrusion |
| ANALYTICAL: | | | | | | | |
| Specific gravity [1] | 73° F. | D-792-60T, Method A. | 1.04 | 1.04 | 1.06 | 1.06 | 1.05 |
| Water absorption [2] | 73° F. Percent | D-570-63 | 0.43 | 0.40 | 0.36 | | 0.43 |
| Mold shrinkage [2] | In./in | D-955-51 | 0.006 | 0.005 | 0.004 | 0.004 | 0.005 |

| Grade and Characteristics | Cycolac ABS Polymers | | | | Cycolon medium impact ABS polymers | | | Special ABS resins |
|---|---|---|---|---|---|---|---|---|
| | H | L | CG | E | A | AH | DH | EP-3510 |
| PROPERTIES—Reported values pertain only to natural resins; pigmenting may vary the properties | Good toughness, injection molding, extrusion | Good toughness at low temp., injection molding, extrusion | Toughness with low gloss, extrusion | Very high impact at low temp., injection molding extrusion | AM for injection molding, AE for extrusion | High heat, injection molding | High heat, injection molding | Grey only, for chrome plated, parts injection molding extrusion |
| MECHANICAL: | | | | | | | | |
| Izod impact strength, unnotched | No break | No break | No break | No break | 23.0 | 18.3 | 15.0 | 26.0 |
| ⅛" bar [2], notched | 6.3 | 6.7 | 8.0 | 8.5 | 4.0 | 4.0 | 3.5 | 4.5 |
| | 2.8 | 4.3 | | | 1.4 | 1.4 | 1.2 | 1.4 |
| | 2.6 | 3.8 | 2.0 | 3.0 | 1.0 | 1.0 | 0.8 | 1.0 |
| Charpy impact strength, unnotched | No break | No break | | | 19.0 | | | 26.0 |
| ¼" bar [1], notched | 5.3 | 6.0 | | | 2.6 | | | 3.7 |
| | 2.9 | 3.7 | | | 1.5 | | | 1.6 |
| | 2.6 | 3.1 | | | 1.2 | | | 1.5 |
| Tensile strength, Type I, ⅛" thickness [2] | 2,400 | 2,600 | | | 3,500 | | | 3,200 |
| | 4,700 | 5,000 | 5,000 | 4,800 | 6,300 | 6,800 | 7,800 | 6,000 |
| | 7,200 | 7,400 | 6,500 | | 10,000 | | | 9,500 |
| Tensile modulus, Type I, ⅛" thickness [2] | 230,000 | 230,000 | 260,000 | 230,000 | 330,000 | 350,000 | 380,000 | 310,000 |
| Flexural strength, ⅛" x 1" x 4" bar [1] | No failure | No failure | No failure | No failure | No failure | | | No failure |
| Flexural yield strength, ⅛" x 1" x 4" bar [1] | 4,100 | 4,300 | 3,500 | | 5,400 | 6,800 | 7,700 | 5,500 |
| | 7,600 | 7,800 | 7,200 | 7,300 | 9,900 | 11,000 | 11,800 | 9,200 |
| | 11,800 | 12,100 | 10,500 | | 17,300 | 17,500 | 18,100 | 15,100 |
| Flexural modulus, ⅛" x 1" x 4" bar [1] | 160,000 | 160,000 | 140,000 | | 240,000 | 250,000 | 300,000 | 210,000 |
| | 240,000 | 250,000 | 260,000 | 230,000 | 260,000 | 370,000 | 400,000 | 330,000 |
| | 280,000 | 180,000 | 300,000 | | 420,000 | 410,000 | 440,000 | 360,000 |
| Hardness, ¼" thickness [1] | 88 | 89 | 88 | 85 | 108 | 108 | 112 | 104 |
| Wear index, Taber, Volume loss method, CS-17 wheel, 1,000 g. weight | 22.7 | 23.0 | | | | | | |
| Deformation under load [1] | 1.22 | 1.12 | | | 0.51 | 0.54 | 0.37 | 0.53 |
| THERMAL: | | | | | | | | |
| Coefficient of linear thermal expansion | $10.4 \times 10^{-5}$ | $10.1 \times 10^{-5}$ | $10.0 \times 10^{-5}$ | | $8.3 \times 10^{-5}$ | $8.5 \times 10^{-5}$ | $7.2 \times 10^{-5}$ | $9.5 \times 10^{-5}$ |
| | $5.8 \times 10^{-5}$ | $5.6 \times 10^{-5}$ | | | $4.8 \times 10^{-5}$ | $4.7 \times 10^{-5}$ | $4.0 \times 10^{-5}$ | $5.3 \times 10^{-5}$ |
| Deflection temperature, unannealed, ½" x ½" x 5" bar [1] | 186 | 187 | 190 | 188 | 187 | 198 | 199 | 192 |
| | 206 | 210 | 214 | | 203 | 210 | 217 | 209 |
| | 223 | 224 | | | 216 | 222 | 227 | 220 |
| Deflection temperature annealed, ½" x ¾" x 5" bar [1] | 214 | 218 | 218 | 218 | 199 | 221 | 223 | 215 |
| | 222 | 224 | 225 | | 211 | 223 | 227 | 221 |
| | 228 | 227 | | | 220 | 227 | 232 | 226 |
| Thermal conductivity | 1.56 | 1.56 | | | 1.49 | | | 1.54 |
| | $5.05 \times 10^{-4}$ | $5.05 \times 10^{-4}$ | | | $5.12 \times 10^{-4}$ | | | $5.30 \times 10^{-4}$ |
| Flammability, ⅛" x ½" x 5" bar [1] | 1.4 | 1.4 | | | 1.6 | 1.6 | 1.6 | 1.5 |
| ANALYTICAL: | | | | | | | | |
| Specific gravity [1] | 1.02 | 1.02 | 1.04 | 1.02 | 1.05 | 1.04 | 1.05 | 1.07 |
| Water absorption [2] | 0.42 | 0.45 | | | 0.40 | 0.33 | 0.32 | 0.40 |
| Mold shrinkage [2] | 0.007 | 0.007 | | | 0.005 | 0.004 | 0.004 | 0.005 |

[1] Compression molded
[2] Injection molded
ASTM D1130-50T
Conditioned by ASTM D618-61

The stabilizer is incorporated in the ABS polymer in suitable mixing equipment, such as a mill, a Banbury mixer, an extruder, and the like.

The stabilized ABS polymer can be worked into the desired shape, such as by milling, calendaring, extrusion or injection molding or fiber molding.

The following examples in the opinion of the inventors represent the best embodiments of their invention.

In the examples, the ABS polymer used was Cycolac T, a polymer of a mixture composed of 27% acrylonitrile, 20% butadiene, and 53% styrene. The two-component stabilizer system of the invention was evaluated against the stabilizing effect of each component thereof, taken singly. The ABS polymer was pigmented by adding 5 parts of titanium dioxide to each 100 parts of the polymer, thus giving the unstabilized ABS polymer a creamy white initial color. The stabilizers being tested were weighed and dispersed in the unstabilized ABS polymer on a two-roll laboratory mill, and fluxed at a temperature of 280 to 300° F. for two to three minutes. The milled sheets were smooth and had dull surfaces. The sheets were then tested for resistance to deterioration when heated, by one or more of the following tests.

Oven aging at 350° F. and 375° F.

The ABS polymer strips cut from the milled sheets were heated in a circulating air oven at temperatures of 350° F. for two hours. Samples were withdrawn at 15 minute intervals and examined for discoloration. The discoloration was then rated visually by color, and numerically by color number, according to the following standard color scale, based on an oven test of a standard polymer heated at 350° F. for three hours:

however applied when the sample is heated at other temperatures, such as 375° F., comparing the sample against the standard at 350° F. A higher temperature is more rigorous, with the result that the color of the polymer may deteriorate two color numbers or more in each heating period.

Compression molding and oven aging

Pieces cut from several milled sheets of ABS polymer, each containing a different stabilizer system were placed side by side in a mold and compression molded at 375° F. for five minutes to give 6 by 6 inch slabs, 40 mils thick, with a glossy surface. Clear demarcation lines were noted between different samples. The whole slabs were aged in a circulating air oven, and strips including a part of each sample were cut off at 15 minute intervals. The colors of the samples were rated and recorded as described.

Mold stability test in absence of air

Pieces cut from several milled sheets of ABS polymer, each containing a different stabilizer or stabilizer combination, were compression molded at 375° F. for varying periods of time. The resulting 6 x 6 x 0.04 inch slabs had a glossy surface and clear demarcation lines between different samples. Sufficient material was placed in the mold to assure some excess over the quantity required to fill the mold completely. The excess was squeezed out as the plastic began to flow and this displacement of plastic also served to assure that any air originally present in the mold was displaced. The colors of the samples after molding for the desired time were rated and recorded as described.

COLOR NUMBER SCALE

| Heating period: | Time of Heating at 350° F. (minutes) | Color Number | Stages of Noticeable Difference in Color |
|---|---|---|---|
| 0 | 0 | 0 | No discoloration from original. |
| 1 | 15 | 1 | First noticeable discoloration from original. |
| 2 | 30 | 2 | First noticeable discoloration from 1. |
| 3 | 45 | 3 | First noticeable discoloration from 2. |
| 4 | 60 | 4 | First noticeable discoloration from 3. |
| 5 | 75 | 5 | First noticeable discoloration from 4. |
| 6 | 90 | 6 | First noticeable discoloration from 5. |
| 7 | 105 | 7 | First noticeable discoloration from 6. |
| 8 | 120 | 8 | First noticeable discoloration from 7. |
| 9 | 135 | 9 | First noticeable discoloration from 8. |
| 10 | 150 | 10 | First noticeable discoloration from 9. |
| 11 | 165 | 11 | First noticeable discoloration from 10. |
| 12 | 180 | 12 | First noticeable discoloration from 11. |

The above table is based on the color change of a non-stabilized standard polymer which develops a further noticeably intensified discoloration in each fifteen minute heating period when heated at 350° F. A polymer sample having improved resistance to discoloration when heated will not develop a noticeably different discoloration in each heating period, but will discolor more slowly, if at all, and will tend to retain a given color over one or more heating periods. Thus, a relatively stable sample after sixty to ninety minutes of heating may well retain a color number maximum of 2 or 3, as compared to 4 to 8 for the standard sample. Thus, the color number is a direct measure of the heat stability, vis-a-vis the color standard.

The color number is based on color change when the standard is heated at 350° F. The color numbers are

EXAMPLES 1 TO 3

An alkyl polyphosphate-polyhydric polycyclic phenol stabilizer system of the invention was evaluated against the stabilizing effect of the components thereof, taken singly. The stabilizers used were penta-2-ethylhexyl-penta-sodium di-tripolyphosphate and 1,4-bis(2'-hydroxy-3'-t-butyl-5'-methylphenyl) 2-butene together with its polymer (Phenol A). In each case, to obtain results based on equal stabilizer concentration, a total of 1 part of stabilizer per 100 parts of ABS polymer was used. Test samples were prepared as described hereinbefore. Tables I-A and I-B below set out the parts of polyphosphate and phenol stabilizer in each system per 100 parts of ABS polymer, and the test results obtained after oven-aging at 350° F. and 375° F., respectively.

TABLE I-A.—OVEN AGING AT 350° F.

| Example No. | Stabilizer System | Amount (parts) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0 Creamy white | 1 Light buff | 2 Light buff | 3 Buff | 4 Buff | 5 Buff | 6 Dark buff | 7 Dark buff | 8 Dark buff |
| Control 2 | Phenol A [1,4-bis(2'-hydroxy-3'-t-butyl-5'-methylphynyl)2-butene] | 1.0 | 0 Creamy white | 1 Pale beige | 2 Pale beige | 3 Beige | 4 Beige | 5 Beige | 6 Beige | 7 Beige | 7 Beige |
| Control 3 | Polyphosphate [penta-2-ethyl-hexyl-pentasodium ditripolyphosphate] | 1.0 | 0 Creamy white | 1 Yellow white | 2 Pale buff tint | 3 Light buff | 4 Buff | 5 Dark buff | 5 Dark buff | 6 Dark buff | 6 Dark buff |
| 1 | Phenol A / Polyphosphate | 0.75 / 0.25 | 0 Creamy white | 0–1 Very pale beige | 1 Pale beige | 1 Pale beige | 2 Pale beige | 2 Pale beige | 3 Beige | 4 Beige | 4 Beige |
| 2 | Phenol A / Polyphosphate | 0.5 / 0.5 | 0 Creamy white | 0–1 Very pale beige | 1 Pale beige | 2 Pale beige | 2 Pale beige | 2 Beige | 3 Beige | 4 Beige | 4 Beige |
| 3 | Phenol A / Polyphosphate | 0.25 / 0.75 | 0 Creamy white | 1 Pale beige | 1 Pale beige | 2 Pale beige | 2 Pale beige | 2 Pale beige | 3 Beige | 3 Beige | 4 Beige |

TABLE I-B.—TEST RESULTS, OVEN AGING AT 375° F.

| Example No. | Stabilizer System | Amount (parts) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0 Creamy white | 5 Buff | 7 Medium buff | 9 Dark buff | 9 Dark buff | 10 Tan | 10 Tan | 10 Tan | 10 Tan |
| Control 2 | Phenol A [1,4-bis(2'hydroxy-3-t-butyl-5'-methylphenyl)2-butene] | 1.0 | 0 Creamy white | 6 Beige | 8 Dark Beige | 9 Light tan | 10 Tan | 10 Tan | 12 Dark tan | 12 Dark tan | 12 Dark tan |
| Control 3 | Polyphosphate [penta-2-ethyl-hexyl-pentasodium ditripolyphosphate] | 1.0 | 0 Creamy white | 5 Buff | 7 Medium buff | 9 Dark buff | 9 Dark buff | 10 Tan | 10 Tan | 10 Tan | 10 Tan |
| 1 | Phenol A / Polyphosphate | 0.75 / 0.25 | 0 Creamy white | 4 Beige | 5 Beige | 7 Medium buff | 8 Dark buff | 9 Light tan | 9 Light tan | 10 Tan | 10 Tan |
| 2 | Phenol A / Polyphosphate | 0.5 / 0.5 | 0 Creamy white | 3 Beige | 4 Beige | 5 Beige | 5 Beige | 7 Medium beige | 8 Dark beige | 9 Light tan | 9 Light tan |
| 3 | Phenol A / Polyphosphate | 0.25 / 0.75 | 0 Creamy white | 3 Beige | 4 Beige | 5 Beige | 6 Beige | 8 Dark beige | 9 Light tan | 10 Tan | 10 Tan |

The data obtained in the oven aging tests at 350° F. and 375° F. show that the stabilizer system of the invention provides ABS polymer with an enhanced resistance to discoloration on heat aging over its components taken singly in the same amounts.

Specifically, taking as a reference point the relatively small extent of discoloration represented by the color number 1, the polymer sample containing the stabilizer combination of Example 1 is about three times as resistant to heat degradation as any of the Control polymer samples, 45 minutes of heating being required to degrade the polymer to the same extent that a 15 minute heating period degrades any of the control samples 1, 2 and 3. Similarly, the polymer samples containing the stabilizer combinations of Examples 2 and 3 are about twice as resistant to heat degradation as any of the control polymers when referred to the extent of discoloration represented by the color number 1.

Comparison of the samples at other reference points provides analogous results. A discoloration rated 3 is reached in 45 minutes by Controls 1 and 2, and passed through between 45 and 60 minutes by Control 3. The polymer samples stabilized with the stabilizer combinations of Examples 1, 2 and 3, on the other hand, reach the discoloration rated 3 only after 90 minutes of heating at 350° F. and in one instance (Example 3) are still at the same level after 105 minutes. Thus for this reference point also, the stabilizer compositions of this invention provide approximately twice the resistance to discoloration of the Controls. A discoloration rated 4 is reached at 60 min. by the Control polymer samples 1, 2 and 3, at 105 minutes by the polymer samples of Examples 1 and 2, and at 120 minutes by the sample of Example 3.

In the oven test at 375° F., a discoloration rated 5 is reached by the Control samples in 15 min., less than 15 min., and 15 min., respectively, and by the polymer samples containing the stabilizer combinations of Examples 1, 2, and 3 in 30, 45, and 45 minutes, respectively. Also, a rating of 9 is reached by the Control samples at 45 minutes, and by the polymer samples containing the stabilizer combinations of Examples 1, 2, and 3 at 75, 105, and 90 minutes, respectively.

Thus, the improved resistance against discoloration provided by the stabilizer combinations of this invention is shown to be largely independent of the test temperature and of the reference point at which the polymer samples are compared.

It should be kept in mind that each polymer sample removed from the oven during the heat stability test represents a separate reference point at which the effectiveness of various stabilizers can be compared. In selecting a stabilizer, the polymer processor suitably uses the reference point most nearly representative of his processing conditions. As the passage of a given quantity of polymer through most types of industrial equipment (extruders, injection molding machines, calendars, etc.) requires almost never more than about 10 minutes, the earliest reference points are usually the most significant. The later ones become increasingly important as the proportion of reworked trimmings or scrap material fed into the equipment along with fresh polymer increases.

EXAMPLES 4 TO 7

The stabilizer system of the invention was evaluated against the stabilizing effect of the various components thereof taken singly, employing a total of 1.0 part of stabilizer in each case. Table II sets out the parts and type of stabilizer in each system per 100 parts ABS polymer and Tables III-A and III-B set out the test results obtained after oven aging at 350° F. and 375° F., respectively. Example 4 was a homogeneous blend of equal amounts of penta-2-ethylhexyl pentasodium di-tripolyphosphate and 1,4-bis(2'-hydroxy-3'-t-butyl-5'-methylphenyl)2-butene (Phenol A).

Examples 5 and 6 were homogeneous blends of equal parts, but different amounts, of pentastearyl penta-sodium di-tripolyphosphate and of Phenol A, and Example 7 was a homogeneous blend of penta-iso-tridecyl pentasodium di-tripolyphosphate and of Phenol A.

TABLE II

| Stabilizer System | Control 1 | Control 2 | Control 4 | Control 5 | Example No. 4 | 5 | 6 | 7 |
|---|---|---|---|---|---|---|---|---|
| 1,4-bis(2'-hydroxy-3'-t-butyl-5'-methylphenyl)-2-butene (Phenol A) | | 1.0 | | | 0.5 | 0.5 | 0.25 | 0.5 |
| Penta 2-ethylhexyl pentasodium di-tripolyphosphate | | | 1.0 | | 0.5 | | | |
| Pentastearly penta-sodium di-tripolyphosphate | | | | | | 0.5 | 0.75 | |
| Penta-iso-tridecyl pentasodium di-tripolyphosphate | | | | 1.0 | | | | 0.5 |

TABLE IIIA.—TEST RESULTS, OVEN AGING AT 350° F.

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | Creamy white | 5 Buff | 7 Dark buff | 3 Buff | 4 Buff | 5 Buff | 6 Dark buff | 7 Dark buff | 8 Dark buff |
| Control 2 | Phenol A [1,4-bis(2-hydroxy-3'-t-butyl-5'-methylphenyl)2-butene] | 1.0 | Creamy white | 6 Beige | 8 Dark beige | 2 Beige | 4 Beige | 5 Beige | 6 Beige | 7 Beige | 7 Beige |
| Control 4 | Stearyl Na polyphosphate | 1.0 | Creamy white | 5 Buff | 8 Dark buff | 3 Buff | 4 Buff | 5 Buff | 6 Buff | 5 Buff | 6 Dark buff |
| Control 5 | Iso-tridecyl Na polyphosphate | 1.0 | Creamy white | 5 Buff | 8 Dark buff | 3 Buff | 4 Buff | 5 Buff | 5 Buff | 5 Buff | 6 Dark buff |
| 4 | 2-ethylhexyl Na polyphosphate / Phenol A | 0.5 / 0.5 | Creamy white | 0-1 Very light buff | 3 Pale beige | 1 Pale beige | 1 Pale beige | 1-2 Pale beige | 2 Pale beige | 3 Pale beige | 3 |
| 5 | Stearyl Na polyphosphate / Phenol A | 0.5 / 0.5 | Creamy white | 0-1 Very pale beige | 5 Beige | 2 Pale beige | 2 Pale beige | 3 Beige | 3 Beige | 4 Beige | 4 Beige |
| 6 | Stearyl Na polyphosphate / Phenol A | 0.75 / 0.25 | Creamy white | 0-1 Very pale beige | 5 Beige | 2 Pale beige | 2 Pale beige | 3 Beige | 3 Beige | 4 Beige | 4 Beige |
| 7 | Iso-tridecyl Na polyphosphate / Phenol A | 0.5 / 0.5 | Creamy white | 0-1 Very pale beige | 5 Beige | Pale beige | Pale beige | Pale beige | Beige | Beige | Beige |

TABLE IIIB.—TEST RESULTS, OVEN AGING AT 375° F.

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | Creamy white | 5 Buff | 7 Dark buff | 9 Dark buff | 9 Dark buff | 10 Tan | 10 Tan | 10 Tan | 10 Tan |
| Control 2 | Phenol A [1,4-bis(2-hydroxy-3'-t-butyl-5'-methylphenyl)2-butene] | 1.0 | Creamy white | 6 Beige | 8 Dark beige | 9 Light tan | 10 Tan | 11 Tan | 12 Tan | 12 Tan | 12 Tan |
| Control 4 | Stearyl Na polyphosphate | 1.0 | Creamy white | 5 Buff | 8 Dark buff | 10 Dark buff | 12 Very dark buff | 12 Very dark buff | 12 Very dark buff | 12 Very dark buff | 12 Very dark buff |
| Control 5 | Iso-tridecyl Na polyphosphate | 1.0 | Creamy white | 6 Buff | 10 Dark buff | 10 Dark buff | 12 Very dark buff | 12 Very dark buff | 12 Very dark buff | 12 Very dark buff | 12 Very dark buff |
| 4 | 2-ethyl hexyl Na polyphosphate / Phenol A | 0.5 / 0.5 | Creamy white | 2 Pale beige | 3 Beige | 5 Beige | 6 Beige | 7 Beige | 7 Dark beige | 8 Dark beige | 8 Dark beige |
| 5 | Stearyl Na polyphosphate / Phenol A | 0.5 / 0.5 | Creamy white | 4 Beige | 5 Beige | 5 Beige | 6 Beige | 7 Dark beige | 8 Dark beige | 8 Dark beige | 8 Dark beige |
| 6 | Stearyl Na polyphosphate / Phenol A | 0.75 / 0.25 | Creamy white | 4 Beige | 5 Beige | 5 Beige | 7 Beige | 8 Dark beige | 8 Dark beige | 8 Dark beige | 8 Dk. yellowish beige |
| 7 | Iso-tridecyl Na polyphosphate / Phenol A | 0.5 / 0.5 | Creamy white | 4 Beige | 5 Beige | 5 Beige | 7 Beige | 8 Beige | 8 Beige | 8 Dark beige | 10 Tan |

The data obtained in the oven aging tests at 350° F. and 375° F. (Tables III-A and III-B) show that the stabilizer system of the invention provides ABS polymer with improved or enhanced resistance to discoloration on heating as compared with the stabilizer components taken alone in the same total amount.

Specifically, taking as a reference point the relatively small over-all discoloration represented by the color number 1, the polymer sample of Example 4 was approximately four times as resistant to heat degradation as any of the control polymer samples 1 to 5. Approximately 60 to 75 minutes of heating were required to degrade the polymer of the example to the same extent that 15 minutes of heating degraded the control samples 1, 2, 4 and 5.

The polymer samples containing the stabilizer compositions of Examples 5, 6 and 7 were approximately twice as resistant to heat degradation as any of the control polymer samples, with reference to the degree of discoloration represented by the color number 1. The same conclusion is reached taking the color numbers 2 and 3 as references.

The control samples 1, 2, 4 and 5 developed a color 2 after 30 minutes of heating, whereas Examples 5 and 7 required 60 minutes of heating before the color 2 was reached, and the control samples reached color 3 after 45 minutes of heating, whereas Examples 5 and 7 required 90 minutes of heating before reaching this color.

In the test at 375° F. a similar improvement is shown. In this instance, Examples 4, 5, 6 and 7 are each approximately twice to three times as resistant to heat deterioration as the control samples. The control samples reached a color of 5 after 15 minutes of heating, whereas the examples required from 30 to 45 minutes of heating before reaching this color, and all the examples retained this color at the end of the 45 minute heating period. The control samples reached a color of from 7 to 8 after 30 minutesof heating, whereas all of the examples retained the color 8 after 120 minutes of heating, and did not reach the colors 7 to 8 until after 60 to 75 minutes of heating. Example 4, in fact, retained color 7 until after 90 minutes of heating, approximately three times as long as the controls.

Thus, the improved resistance to heat deterioration provided by the stabilizer compositions of this invention is shown to be largely independent of the test temperatures and the reference points at which the polymer samples are compared. If anything, the improvement in the resistance is greater at the higher 375° F. test temperature (for example, Examples 5, 6 and 7) than at the 350° F. temperature.

EXAMPLES 8 AND 9

Other stabilizer systems of the invention employing various alkyl polyphosphate salts with the same polyhydric polycyclic phenol were evaluated as stabilizers for ABS polymers employing 0.5% total stabilizer. Table IV sets out the parts and type of stabilizer in each system per 100 parts ABS polymer, Tables V-A and V-B set out the test results obtained after oven aging at 350° F. and 375° F., respectively.

TABLE IV

| Stabilizer System | Control 1 | Control 6 | Example No. 8 | Example No. 9 |
|---|---|---|---|---|
| 1,4-bis(2'-hydroxy-3'-t-butyl-5'-methyl-phenyl)2-butene | | 0.5 | 0.25 | 0.25 |
| Penta-2-ethylhexyl penta-sodium di-tripolyphosphate | | | 0.25 | |
| Deca-2-ethylhexyl penta-barium tetratripoly-phosphate | | | | 0.25 |

TABLE V-A.—TEST RESULTS, OVEN AGING AT 350° F.

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0. Creamy white | 1. Light buff | 2. Light buff | 3. Buff | 4. Buff | 5. Buff | 6. Dark buff | 7. Dark buff | 8. Dark buff. |
| Control 6 | Phenol A [1,4-bis (2'-hydroxy-3'-t-butyl-5'-methyl-phenyl) 2-butene] | 0.5 | 0. Creamy white | 1. Pale beige | 2. Pale beige | 3. Beige | 3. Beige | 4. Beige | 4. Beige | 5. Beige | 5. Beige. |
| 8 | 2-ethylhexyl Na polyphosphate / Phenol A | 0.25 / 0.25 | 0. Creamy white | 0-1. Very pale beige | 0-1. Very pale beige | 1. Pale beige | 2. Pale beige | 2. Beige | 3. Beige | 3. Beige | 4. Beige. |
| 9 | 2-ethylhexyl Ba polyphosphate / Phenol A | 0.25 / 0.25 | 0. Creamy white | 0-1. Very pale beige | 1. Pale beige | 1. Beige | 2. Beige | 2. Beige | 3. Beige | 3. Beige | 4. Beige. |

TABLE V-B.—TEST RESULTS, OVEN AGING AT 375° F.

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0. Creamy white | 5. Buff | 7. Dark buff | 9. Dark buff | 9. Dark buff | 10. Very dark buff | 10. Very dark buff | 10. Very dark buff | 10. Very dark buff. |
| Control 6 | Phenol A [1,4-bis-(2'-hydroxy-3'-t-butyl-5'-methyl-phenyl)2-butene] | 0.5 | 0. Creamy white | 5. Beige | 6. Beige | 7. Beige | 8. Dark beige | 10. Light tan | 10. Tan | 11. Dark tan | 12. Dark tan. |
| 8 | 2-ethylhexyl Na polyphosphate / Phenol A | 0.25 / 0.25 | 0. Creamy white | 1. Pale beige | 3. Beige | 4. Beige | 5. Beige | 6. Beige | 6. Beige | 7. Beige | 8. Dark beige. |
| 9 | 2-ethylhexyl Ba polyphosphate / Phenol A | 0.25 / 0.25 | 0. Creamy white | 1. Pale beige | 3. Beige | 4. Beige | 5. Beige | 6. Beige | 7. Beige | 8. Dark beige | 9. Light tan. |

The data obtained in the oven aging tests at 350° F. and 375° F. show that the stabilizer system of the invention provides ABS polymer with an enhanced resistance to discoloration upon being exposed to elevated temperatures over its components taken singly in the same total amount.

EXAMPLES 10 TO 12

Other stabilizer systems of the invention employing various polyhydric polycyclic phenols with the same alkyl polyphosphate salt were evaluated as stabilizers for ABS polymer and Table VII-A sets out the test results obtained after oven aging for various times at 350° F., and Table VII-B sets out the test results obtained after heating for various times at 375° F. and compression molding at 375° F.

TABLE VI

| Stabilizer System | Control 1 | Control 7 | Example 10 | Control 8 | Example 11 | Control 9 | Example 12 |
|---|---|---|---|---|---|---|---|
| Penta-2-ethylhexyl pentasodium ditripolyphosphate | | | 0.25 | | 0.25 | | 0.25 |
| 1,1,3-tris(2'-methyl-4'-hydroxy-5'-t-butylphenyl)butane (Phenol "B") | | 0.5 | | | | | |
| 4,4'-thiobis(2'-t-butyl-5'methylphenol) (Phenol "C") | | | | 0.5 | | | |
| Bis(3-t-butyl-4-hydroxy-5-methylbenzyl) sulfide (Phenol "D") | | | | | | 0.5 | |

TABLE VII-A.—TEST RESULTS, OVEN AGING AT 350° F.

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0. Creamy white | 1. Light buff | 2. Light buff | 3. Buff | 4. Buff | 5. Buff | 6. Dark buff | 7. Dark buff | 8. Dark buff |
| Control 7 | Phenol B | 0.5 | 0. Creamy white | 0-1. Pale beige | 2. Pale beige | 3. Beige | 4. Beige | 4. Beige | 5. Beige | 6. Beige | 7. Beige |
| 10 | Phenol B Polyphosphate¹ | 0.25 0.25 | 0. Creamy white | 0-1. Very pale beige | 1. Pale beige | 1-2. Pale beige | 2. Pale beige | 3. Beige | 3. Beige | 4. Beige | 4. Beige |
| Control 8 | Phenol C | 0.5 | 0. Creamy white | 1. Very pale beige | 2. Grayish beige | 3. Grayish beige | 4. Grayish beige | 4. Grayish beige | 5. Grayish beige | 5. Dark grayish beige | 6. Dark grayish beige |
| 11 | Phenol C Polyphosphate¹ | 0.25 0.25 | 0. Creamy white | 0-1. Lt. grayish beige | 0-1. Grayish beige | 1. Pale beige | 2. Pale beige | 2. Light beige | 3. Beige | 4. Beige | 4. Beige |
| Control 9 | Phenol D | 0.5 | 0. Creamy white | 1. Very pale beige | 2. Grayish beige | 3. Grayish beige | 4. Grayish beige | 4. Grayish beige | 5. Grayish beige | 5. Grayish beige | 6. Grayish beige |
| 12 | Phenol D Polyphosphate¹ | 0.25 0.25 | 0. Creamy white | 0-1. Very pale beige | 0-1. Very pale beige | 1. Pale beige | 2. Pale beige | 2. Light beige | 3. Beige | 4. Beige | 4. Beige |

¹ 2-ethylhexyl Na polyphosphate.

TABLE VII-B
[Test Results, 6 x 6 x 0.04 Inch Compression Molded Panel Tested in Oven at 375° F.]

| Example No. | Stabilizer System | Amount (part) | 0 min. | 15 min. | 30 min. | 45 min. | 60 min. | 75 min. | 90 min. | 105 min. | 120 min. |
|---|---|---|---|---|---|---|---|---|---|---|---|
| Control 1 | No stabilizer | 0 | 0. Creamy white | 5. Light buff | 7. Medium buff | 9. Dark buff | 9. Dark buff | 9. Dark buff | 9. Dark buff | 10. Dark buff | 10. Very dark buff |
| Control 7 | Phenol B | 0.5 | 0. Beige | 3. Beige | 4. Beige | 7. Beige | 8. Tan | 9. Tan | 10. Dark tan | 10. Very dark buff | 11. Very dark buff |
| 10 | Phenol B Polyphosphate [2-ethylhexyl Na polyphosphate] | 0.25 0.25 | 0. Very pale beige | 1-2. Pale beige | 3. Beige | 3-4. Beige | 6. Beige | 7. Tan | 8. Dark tan | 8. Dark tan | 9. Dark tan |
| Control 8 | Phenol C | 0.5 | 0-1. Very pale beige | 1-2. Pale beige | 3. Beige | 7. Beige | 8. Beige | 9. Beige | 10. Tan | 11. Tan | 11. Tan |
| 11 | Phenol C Polyphosphate [2-ethylhexyl Na polyphosphate] | 0.25 0.25 | 1. Pale beige | 2. Beige | 4. Beige | 4. Beige | 6. Beige | 7. Tan | 8. Tan | 8. Dark tan | 9. Dark tan |
| Control 9 | Phenol D Polyphosphate | 0.25 0.5 | 0. Creamy white | 3. Pale beige | 3. Beige | 4. Beige | 7. Beige | 9. Tan | 10. Tan | 11. Dark tan | 11. Dark tan |
| 12 | Phenol D Polyphosphate [2-ethylhexyl Na polyphosphate] | 0.25 0.25 | 0. Creamy white | 1-2. Pale beige | 3. Beige | 4. Beige | 6. Beige | 7. Beige | 8. Tan | 8. Tan | 9. Tan |

The data obtained in the oven aging test at 350° F. and the compression molding test at 375° F. show that the stabilizer system of the invention provides ABS polymer with an enhanced resistance to discoloration upon being exposed to elevated temperatures over its components taken singly in the same total amount.

EXAMPLE 13

The stabilizer system of the invention was evaluated against the stabilizing effect of the various components thereof individually, employing 0.6 part of stabilizer in each sample. Composition of the samples and results obtained in compression molding the milled sheets at 375° F. in the absence of air for 5, 30 and 60 minutes are shown in Table VIII.

total valence of the $z(P_xO_{3x+1})$ radicals; and a polyhydric polycyclic phenol having the formula:

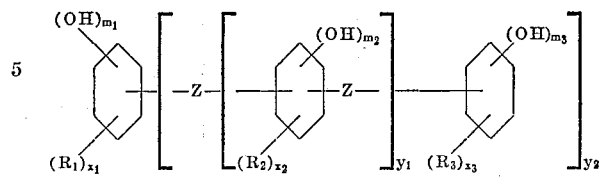

wherein $R_1$, $R_2$ and $R_3$ are inert substituents selected from the group consisting of hydrogen, halogen, and organic radicals containing from one to about thirty carbon atoms selected from the group consisting of alkyl, aryl, alkenyl,

TABLE VIII.—COMPRESSION MOLDING AT 375° F.

| Example No. | Stabilizer System | Amount (part) | Milled Sheet | Molded, 5 min. | Molded, 30 min. | Molded, 60 min. |
|---|---|---|---|---|---|---|
| Control 1 | No stabilizer | 0 | 0 Creamy white | 1 Pale beige | 2 Beige | 3 Beige. |
| Control 10 [1] | Phenol A | 0.6 | 0 Creamy white | 2 Grayish beige | 3 Grayish beige | 3 Grayish beige. |
| Control 11 | Sodium 2-ethylhexyl polyphosphate | 0.6 | 0 Creamy white | 1 Pale beige | 2 Beige | 2 Beige. |
| Example 13 | Phenol A Sodium 2-ethylhexyl polyphosphate | 0.3 0.3 | 0 Creamy white | 0 Creamy white | 0–1 Very pale beige | 0–1 Very pale beige. |

[1] Control 10 rated by comparison with Control 1.

In the absence of air, all samples discolored less than in the presence of air. In the absence of air, the sample containing only the phenol was poorer than an unstabilized sample. The stabilizer combination of Example 13 provided good protection and a substantial improvement over the next best formulation (unstabilized or polyphosphate alone), whether the molding cycle was short (5 minutes) or as long as 60 minutes at 375° F.

Further appreciation of the effectiveness of the stabilizer combination can be gained by considering the effectiveness of stabilizers in the presence and absence of air. These conditions in actual practice are not alternatives, but can occur successively on a single sample:

| | No stabilizer | Phenol only | Polyphosphate only | Combination |
|---|---|---|---|---|
| With air | Poor | Good | Poor | Very good. |
| Without air | Good | Fair | Good | Do. |

Having regard to the foregoing disclosure, the following is claimed as the inventive and patentable embodiments thereof:

1. A stabilizer combination capable of enhancing the resistance of acrylonitrile butadiene styrene polymers to deterioration when heated at 350° C., consisting essentially of an alkyl polyphosphate salt having the formula: $M_nR_m(P_xO_{3x+1})_z$ wherein M is selected from the group consisting of alkali metal, alkaline earth metal, tin, zinc, cadmium, nickel, ammonium, quaternary ammonium, and organic amine cations, R is an alkyl radical having from one to about twenty-four carbon atoms, $x$ is an integer from 2 to 4, $z$ is the number of $(P_xO_{3x+1})$ radicals, and is an integer from 1 to $$\frac{n(\text{valence of metal}) + m}{\text{valence of polyphosphate group}}$$

$n$ is the number of M cations, and is an integer from 1 to $$\frac{z(\text{valence of polyphosphate group}) - m}{\text{valence of metal}}$$

and $m$ is the number of R groups, and is an integer from 1 to $z$ (valence of the polyphosphate group) $-n$(valence of metal), and the total of $n+m$ is taken to satisfy the alkaryl, aralkyl, cycloalkenyl, cycloalkyl, alkoxy, aryloxy, acyl, carboxyl, and thiohydrocarbon groups, Z is selected from the group consisting of oxygen, sulfur, alkylene, alkenylene, alicyclene, arylene, and mixed alkylene-arylene and alkylene-alicyclene groups, $m_1$ and $m_3$ are integers from 1 to a maximum of 5, and $m_2$ is an integer from 1 to a maximum of 4, $x_1$ and $x_3$ are integers from 0 to 4, and $x_2$ is an integer from 0 to 3, $y_1$ is an integer from 0 to about 6, and $y_2$ is an integer from 1 to about 5, the polyphosphate being present in an amount to enhance the stabilizing effectiveness of the phenol.

2. A stabilizer combination in accordance with claim 1 wherein the alkyl polyphosphate salt is an alkali metal salt.

3. A stabilizer combination in accordance with claim 1 wherein the alkyl polyphosphate is an alkaline earth metal salt.

4. A stabilizer combination in accordance with claim 1 wherein the alkyl polyphosphate salt is an ammonium salt.

5. A stabilizer combination in accordance with claim 1 wherein the alkyl polyphosphate salt is an amine salt.

6. A stabilizer combination in accordance with claim 1 wherein the alkyl polyphosphate salt is a cadmium salt.

7. A stabilizer combination in accordance with claim 1 wherein the alkyl polyphosphate salt is a nickel salt.

8. A stabilizer combination in accordance with claim 1 wherein the alkyl polyphosphate salt is a zinc salt.

9. A stabilizer combination in accordance with claim 1 wherein Z is sulfur.

10. A stabilizer combination in accordance with claim 1 wherein Z is alkylene.

11. A stabilizer combination in accordance with claim 1 wherein Z is alkenylene.

12. A stabilizer combination in accordance with claim 1 wherein $R_1$, $R_2$ and $R_3$ are alkyl substituents.

13. An acrylonitrile butadiene styrene polymer, having its resistance to deterioration when heated at 300° F. and above enhanced by an amount within the range from about 0.1 to about 10% by weight of the polymer of a stabilizer combination in accordance with claim 1.

14. An acrylonitrile butadiene styrene polymer in accordance with claim 13, in which the amount of polyphosphate is within the range from about 0.05 to about 5% and the amount of polycyclic polyhydric phenol is within the range from about 0.05 to about 5%.

15. A stabilizer combination in accordance with claim 1 including in addition an organic phosphite having the formula $(RA)_3P$ in which A is selected from the group consisting of oxygen, sulfur and a mixture of oxygen and sulfur, and R is selected from the group consisting of aryl, alkyl, cycloalkyl, aralkyl and alkaryl groups in any combinations.

References Cited

UNITED STATES PATENTS

| | | | |
|---|---|---|---|
| 2,499,503 | 3/1950 | Huff et al. | 260—45.7 |
| 2,577,635 | 12/1951 | Serdynsky et al. | 260—45.7 |
| 2,581,360 | 1/1952 | Costa et al. | 260—45.7 |
| 2,587,477 | 2/1952 | Hunter | 260—45.7 |
| 2,604,458 | 7/1952 | Havens | 260—45.7 |
| 2,604,459 | 7/1952 | Jankowiak | 260—45.7 |
| 2,680,106 | 6/1954 | Havens | 260—45.7 |
| 2,753,321 | 7/1956 | Jankens | 260—45.7 |
| 2,831,824 | 4/1958 | White | 260—45.7 |
| 3,026,297 | 3/1962 | Spacht | 260—45.95 |
| 3,211,794 | 10/1965 | Coffield | 260—881 |
| 3,244,650 | 4/1966 | Hecker et al. | 260—45.95 |
| 3,244,668 | 4/1966 | Knapp et al. | 260—45.85 |
| 3,267,069 | 8/1966 | Cummings | 260—45.75 |
| 3,352,820 | 11/1967 | Bawn | 260—45.75 |

DONALD E. CZAJA, Primary Examiner

V. P. HOKE, Assistant Examiner

U.S. Cl. X.R.

252—400; 260—23, 32.8, 33.41, 37, 45.7, 45.9, 45.85, 45.95, 880